3,318,829
POLYVINYL ACETATE COMPOSITIONS CONTAINING AMMONIUM BORATE COMPOUNDS
Mitchell P. Ptasienski, Elk Grove Village, Ill., assignor to United States Gypsum Company, a corporation of Delaware
No Drawing. Filed Sept. 10, 1962, Ser. No. 222,661
15 Claims. (Cl. 260—29.6)

This present invention relates to reduction of corrosion caused by aqueous polyvinyl acetate compositions.

It is well known that polyvinyl acetate resins in the form of aqueous emulsions find widespread use in industry, for example in paints, spackling putty, adhesives, joint sealing compounds and for other purposes. A very serious problem encountered with the use of aqueous polyvinyl acetate compositions is the tendency of such compositions to cause corrosion and rusting of metals exposed thereto. Thus, aqeous compositions of the type indicated containing polyvinyl acetate as an ingredient along with water have been found to rust tools, nail heads, metal corner reinforcing strips and so forth. Moreover, such compositions are highly corrosive to steel or other metal containers in which the material is shipped. Rust forms upon the inside of steel shipping containers especially above the level of the composition and particularly upon the lids. This tendency to rust and corrode metal shipping containers is a definite disadvantage associated with the use of aqueous polyvinyl acetate compositions and considerable effort has been made to prevent it. One expedient which has been suggested in the past is to apply a protective coating of some type to the inside surfaces of the shipping container. Lacquering the inner surfaces of steel and like shipping containers reduces to some extent the tendency to rust but is not entirely satisfactory. The use of a protective coating in steel shipping containers not only increases the cost of the container but often makes it necessary to re-design the crimp on the lid so as not to leave an exposed untreated edge. Accordingly, the provision of an additive which can be incorporated in aqueous polyvinyl compositions to reduce corrosion attributed thereto constitutes a highly useful contribution to the art.

It has now been discovered that metal corrosion caused by aqueous polyvinyl acetate compositions can be reduced by addition to such compositions of a minor amount of an ammonium borate compound. Representative ammonium borate compounds are ammonium pentaborate, diammonium tetraborate, ammonium fluoroborate and the like.

The ammonium borate additive is incorporated into a composition containing polyvinyl acetate together with water in amounts sufficient to retard corrosion attributable to the presence of the polyvinyl acetate. Because of the wide variety of aqueous polyvinyl compositions in use, it is obviously impossible to define categorically the specific amount of the additive to employ based on the total composition but it is usually employed in relatively minor proportions. In general the amount of the ammonium borate additive based on the amount of polyvinyl acetate present in the composition ranges from about 1 to 45 percent by weight or more, preferably from about 3 to 45 percent or more. The ammonium borate additive can be incorporated in compound form or it can be formed in situ by incorporating into the aqueous composition proper proportions of ammonia and a compound capable of reacting therewith to yield the borate radical, such as for example by reacting boric acid with a stoichiometric quantity or preferably an excess of ammonium hydroxide.

The ammonium borate additives can be incorporated in accordance with the invention in any material or composition containing polyvinyl acetate and water which presents a metal corrosion problem and in which the use of relatively minor amounts of such additives is not detrimental. The present invention therefore has widespread applicability and constitutes an eminently useful contribution to the art. Representative aqueous compositions in which polyvinyl acetate is employed include vinyl exterior paints, paint sealers, ready mix paint compounds, spackling putty and the like.

Typical aqueous polyvinyl acetate compositions in which the ammonium borate compounds can be advantageously employed to reduce the metal corrosion-inducing tendencies thereof are the following:

| Typical vinyl exterior paint: | Approx. lbs./100 gal. |
|---|---|
| Titanium dioxide | 192 |
| Mica | 20 |
| Pyrophyllite fines | 60 |
| Methyl cellulose solution, 2½% | 200 |
| Dispersing agents | 2.25 |
| Preservatives | 5.25 |
| Defoamers | 2.67 |
| Glycol | 13.0 |
| Ammonium pentaborate | 24.0 |
| Polyvinyl acetate emulsion (55% solids) | 296.5 |
| Water | 200 |
| Clay | 30 |

| Typical vinyl paint sealer composition: | Approx. lbs./100 gal. |
|---|---|
| Titanium dioxide | 95.0 |
| Pyrophyllite fines | 36.0 |
| Mica | 17.2 |
| Dispersing agents | 0.8 |
| Fungicide | 2.26 |
| Anti-foam | 2.26 |
| Polyvinyl acetate emulstion (55% solids) | 205 |
| Methyl cellulose solution, 2½% | 166 |
| Water | 200 |
| Ammonium pentaborate | 17 |

| Typical ready mix joint compound: | 100% solids* |
|---|---|
| Mica 100% minus thru 40 mesh | 40 |
| Cellulose thickener | 0.8 |
| Asbestos (washed 100% thru 40 mesh) | 3.5 |
| Powdered calcium carbonate | 48.7 |
| Ammonium pentaborate | 1.5 |
| Preservative | Negl. |
| Polyvinyl acetate and plasticizer (10%) (added as an emulsion containing 55% solids) | 5.5 |

| Typical paste spackling putty: | 100% solids* |
|---|---|
| Mica 100% minus 40 mesh | 15.0 |
| Cellulose thickener | 0.8 |
| Powdered clay | 15.0 |
| Asbestos (washed 100% thru 40 mesh) | 3.5 |
| Ammonium pentaborate | 1.5 |
| $TiO_2$ | 1.0 |
| Calcium carbonate | 59.9 |
| Preservative | Negl. |
| Polyvinyl acetate and plasticizer (10%) (added as an emulsion containing 55% solids) | 3.5 |

*Water added to obtain desired viscosity.

Products such as those can be stored in metal containers for extended periods of time such as for example approximately a year without any substantial evidence of rusting of the metal containers.

To illustrate the advantages of the invention, accelerated rusting tests were conducted employing an aqueous paint sealer composition containing approximately 43.8 percent of a polyvinyl acetate emulsion (about 53% solids). The paint sealer compositions were stored in lined and unlined steel containers for 11 days in which the following cycle was observed:

24 hours at 90° F. and 90% relative humidity
24 hours at 40° F.
24 hours at room temperature (75° F.)

The results of the tests indicated that rusting was substantially reduced by the use of sufficient amounts of ammonium borate. The diammonium tetraborate compound gave somewhat better results than ammonium pentaborate, and best results were obtained with the use of ammonium hydroxide and boric acid in a molar ratio of 2.5:1. Ammonium fluoroborate retarded rusting but a dark discoloration of the container was noted under these test conditions.

As indicated, compositions containing polyvinyl acetate and water present serious metal rusting problems, especially to metal containers in which such materials are shipped and stored. It is to the reduction or elimination of these rusting problems that the present invention is directed and in accordance therewith aqueous polyvinyl acetate compositions are obtained having enhanced anti-rust characteristics. The invention is particularly suitable for reducing rusting of steel containers in which aqueous polyvinyl acetate compositions are shipped and stored for extended periods. However, it is to be understood that the corrosion reducing additives of this invention are particularly effective and useful for addition to dry polyvinyl acetate compositions which at some time are intended to be mixed with water, thus being an aqueous polyvinyl composition in the broad meaning of the term as is intended in the present specification and claims. Such compositions comprise, for example, paste spackling putty compounds which, while formulated in dry form, are mixed with water in the ultimate use thereof.

The polyvinyl acetate employed in compositions prepared in accordance with the invention is polyvinyl acetate which is stable to borate ions; polyvinyl acetate emulsions of this type in which the polyvinyl acetate is dispersed in water are commercially available at the present time from a number of suppliers.

Those modifications and equivalents which fall within the spirit of the invention and the scope of the appended claims are to be considered part of the invention.

I claim:
1. A composition comprising a water dispersion of polyvinyl acetate stable to borate ions and an amount of an ammonium borate compound sufficient to reduce the metal corrosion-inducing characteristics of the composition.
2. A composition according to claim 1 wherein the ammonium borate compound is ammonium pentaborate.
3. A composition according to claim 1 wherein the ammonium borate compound is diammonium tetraborate.
4. A composition according to claim 1 wherein the ammonium borate compound is ammonium fluoroborate.
5. A composition comprising a water dispersion of polyvinyl acetate stable to borate ions and an ammonium borate compound in an amount more than about 1 percent based on the weight of the polyvinyl acetate in the composition, said amount of the ammonium borate compound being sufficient to reduce the metal corrosion-inducing characteristics of the composition.
6. A composition according to claim 5 wherein the ammonium borate compound is ammonium pentaborate.
7. A composition according to claim 5 wherein the ammonium borate compound is diammonium tetraborate.
8. A composition according to claim 5 wherein the ammonium borate compound is ammonium fluoroborate.
9. The method of improving the anti-corrosion characteristics of a composition containing polyvinyl acetate stable to borate ions and water which comprises incorporating in said composition an ammonium borate compound in an amount sufficient to reduce the metal corrosion-inducing characteristics of the composition.
10. The method of claim 9 wherein the ammonium borate compound employed is ammonium pentaborate.
11. The method of claim 9 wherein the ammonium borate compound employed is diammonium tetraborate.
12. The method of claim 9 wherein the ammonium borate compound employed is ammonium fluoroborate.
13. The method of improving the anti-corrosion characteristics of a composition containing polyvinyl acetate stable to borate ions and water which comprises incorporating in said composition an ammonium compound and a borate yielding compound reactable therewith to form an ammonium borate compound, the amount of ammonium borate compound formed being sufficient to reduce the metal corrosion-inducing characteristics of the composition.
14. The method of improving the anti-corrosion characteristics of a composition containing polyvinyl acetate, which composition is adapted for ultimate mixing with water, which comprises incorporating in said composition an ammonium borate compound in an amount sufficient to reduce the metal corrosion-inducing characteristics of the composition.
15. The method of reducing rusting in metal containers containing aqueous polyvinyl acetate compositions which comprises incorporating into said container an ammonium borate compound in an amount sufficient to retard rusting of the container.

References Cited by the Examiner

UNITED STATES PATENTS

| | | | |
|---|---|---|---|
| 2,662,863 | 12/1953 | Bristol et al. | 260—29.6 |
| 2,805,915 | 9/1957 | Rohrback | 252—387 |
| 2,809,949 | 10/1957 | Orth | 260—29.6 |
| 3,030,308 | 4/1962 | Agnew et al. | 252—387 |
| 3,033,670 | 5/1962 | Stanford et al. | 252—387 |
| 3,053,692 | 9/1962 | Pocock | 260—29.6 |

MURRAY TILLMAN, *Primary Examiner.*

LEON J. BERCOVITZ, J. L. WHITE, L. B. WOODRUFF, *Assistant Examiners.*